Jan. 28, 1964   R. SIEFERT   3,119,228
REGULATING MECHANISM
Filed March 28, 1962

United States Patent Office 3,119,228
Patented Jan. 28, 1964

3,119,228
REGULATING MECHANISM
Roland Siefert, Schwenningen (Neckar), Germany, assignor to Kienzle Uhrenfabriken A.G., Schwenningen (Neckar), Germany, a corporation of Germany
Filed Mar. 28, 1962, Ser. No. 183,122
3 Claims. (Cl. 58—113)

This invention relates to regulating mechanisms for watches or clocks having a hair spring the effective length of which is altered by the position of an index member or regulator carrying a curb having opposed curb pins inner and outer from the fixed end portion or regulating range of the spring to engage opposite sides of the spring in such range in a well known manner.

The invention particularly relates to such a mechanism in which the spring is originally normally in the form of an Archimedes spiral in the regulating range as well as in the main body of the spring. In the regulating range the spring is not of circular shape yet has a fixed origin at the center of the balance wheel (not shown).

An object of the invention is to provide a mounting for the curb or key, as it is sometimes called, which will enable the curb to move and follow the spiral spring without tending to force the latter out of its normal spiral form.

There are regulating devices wherein the curb is not only moved circularly about the center of the balance wheel but means are additionally provided to move the curb radially.

There is also a similar device in which the regulator is mounted on an eccentric ring. By turning this ring the curb is moved radially with respect to the balance wheel center. This device so operates that for every position of the index member, the spring can be brought into the middle of the curb by turning the ring, as is necessary, if the end curve or fixed end portion of the spiral is not circularly concentric with the center of the balance wheel. The disadvantage of this device is that for each angular adjustment of the regulator an additional adjustment of the eccentric ring is required. Not only is this necessary in regulating the clock during its life but at the time of manufacture also. This entails an additional step in production as well as an increase in the number of parts.

The present invention provides a regulator mechanism which in practice enables the middle of the slit or gap between the curb pins on a turnable regulating member to receive the outer end portion of an Archimedes spiral spring throughout the normal regulating range with sufficient exactness. This is done by having the curb pins move, during regulation, about in a circle which has the same radius of curvature as the Archimedes spiral at, say, the mid point of the regulating range.

Figure 1:
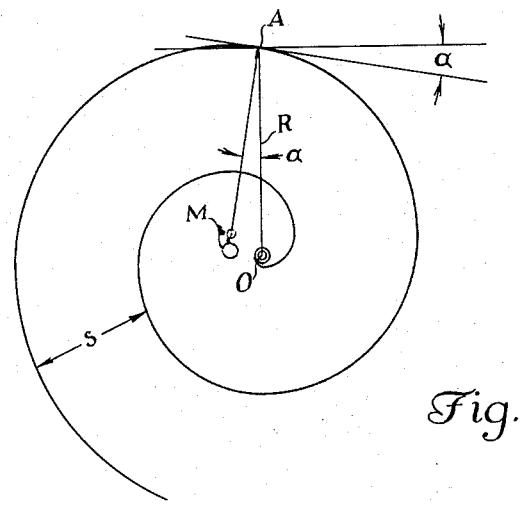
Figure 2:
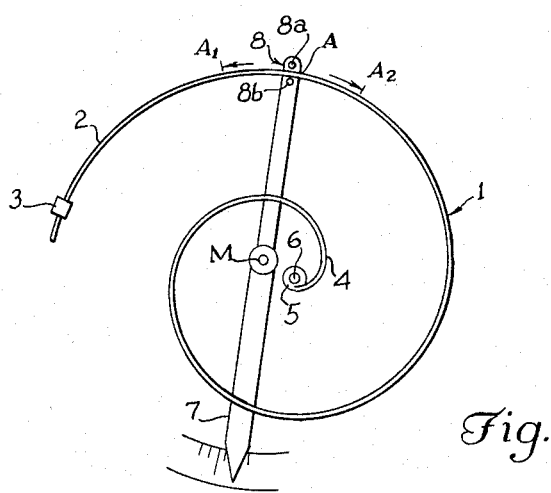

FIG. 1 shows an Archimedes spiral, and
FIG. 2 is a diagrammatic representation of an embodiment of the invention.

The radius of curvature R of an Archimedes spiral of the form $$r = \frac{s}{2\pi}\varphi$$

where $r$ is the radius vector or the distance of a point on the spiral from its origin, $s$ is a constant and equal to the distance between turns, and $\varphi$ the angle of rotation, can be taken as $r$ when $$\frac{s}{2\pi}$$

is appreciably less than $r$.

The angle $\alpha$ between the tangent at a point A on the spiral and the tangent of a circle about the spiral origin at the same point, which may be expressed as the angle between the radius vector and the normal at the point A of the Archimedes spiral, is determined as $$\tan \alpha = \frac{s}{2\pi r}$$

Hence the center of the circle of curvature can be determined. It lies on a line and at a distance $R=r$ from point A which line makes the angle $\alpha$ with the radius vector, and $\alpha$ is the angle OAM, when O is the origin of the Archimedes spiral, A the point on the spiral and M the center of the circle of curvature at A. The circular path of the spring curb about M passes mathematically exactly through point A. Moreover the deviations of this circle of curvature within the regulating range of the curb from the form of a spiral are with comparatively little distortion as they are employed in practice on balance wheel springs and are negligibly small.

Thus in a construction as shown in FIG. 2 the hair spring 1 in the form of an Archimedes spiral is mounted fast at its outer end portion 2 on a post 3 and its inner end portion 4 on the hub 5 of the pivot shaft 6 of the balance wheel (not shown).

The regulator 7 is mounted for turning about the point M situated with respect to the pivot shaft 6 at O in accordance with the above described restrictions. The regulator carries a curb 8 such as formed by outer and inner curb pins 8a and 8b normally engaging the spring about at point A for correct operation of the watch or clock. Within the regulating range of the arm $A_1A_2$ the arc of circular movement of the curb 8 is very nearly coincident with element of the spiral.

The invention claimed is:

1. In a horological instrument, a regulator having curb means and an Archimedes spiral hair spring of the shape represented by the equation $$r = \frac{s}{2\pi}\varphi$$

where $r$ is the distance from the origin O of the spiral to a point thereon, $s$ is a constant and equal to the spacing between turns and $\varphi$ the angular position of the radius vector, the curb means of the regulator for said spring being turnable about a point M located a distance $r$ from a point A on the spring, said point A being substantially the point of engagement of said spring with the curb for correct operation of the instrument, and said point M being located on the normal to said spring at said point A, said normal making an angle OAM with OA the radius vector, and the tangent of angle OAM being equal to $$\frac{s}{2\pi r}$$

2. A horological instrument having a balance wheel pivot shaft, an Archimedes spiral shaped hair spring fixed at the outer end portion thereof and having the inner end portion secured to the shaft, the origin of the spiral of the spring being at the axis of the shaft, a regulator carrying fast thereon curb means for engaging the outer end portion of the spring within the regulating range thereof, the regulator being mounted for turning about a fixed point displaced from the axis of the pivot shaft, the point lying on the normal to the spiral about at the mid point of said regulating range, and at the same distance from said mid point that the latter is from the pivot shaft axis.

3. In a horological instrument escapement mechanism, a hair spring having an inner end portion and a balance wheel shaft secured thereto, the spring having a spiral shape represented by the formula $$r = \frac{s}{2\pi}\varphi$$

where $r$ is the distance from an outer point on the spiral to the origin thereof, $\varphi$ is number of turns in radians of the spiral from the origin to the outer point, and $s$ the distance between turns and constant, a regulator and curb for curbing radial movement of said spring about at a given detention point by engagement of the curb on the spring substantially at said detention point, and means for mounting the regulator to turn about a center displaced from the axis of the shaft to carry the curb in a circular arc, said center being the same distance from said detention point as is the origin of the spiral of the spring and near the said origin and angularly displaced therefrom about said detention point by the angle $$\arctan \frac{s}{2\pi r}$$

to make the circular arc nearly coincident with the spiral adjacent said detention point, $$\frac{s}{2\pi}$$

being much less than $r$ at said detention point.

References Cited in the file of this patent
FOREIGN PATENTS
131,856 Switzerland _____ June 1, 1929